United States Patent [19]

Kogure et al.

[11] Patent Number: 4,603,721

[45] Date of Patent: Aug. 5, 1986

[54] BASE-CAP TIRE TREAD

[75] Inventors: Tomohiko Kogure, Minami-ashigara; Ryoji Hanada; Kazuyuki Kabe, both of Hiratsuka, all of Japan

[73] Assignee: The Yokohama Rubber Co., Ltd., Tokyo, Japan

[21] Appl. No.: 736,729

[22] Filed: May 22, 1985

[30] Foreign Application Priority Data

May 31, 1984 [JP] Japan .................................. 59-109627

[51] Int. Cl.$^4$ ............................................. B60C 11/00
[52] U.S. Cl. ................................................. 152/209 R
[58] Field of Search ......................... 152/209 R, 209 P

[56] References Cited

U.S. PATENT DOCUMENTS

| | | | |
|---|---|---|---|
| 3,157,218 | 11/1964 | Brown | 152/209 R |
| 3,759,306 | 9/1973 | Greiner et al. | 152/209 R |
| 4,319,619 | 3/1982 | Kozima et al. | 152/209 R |
| 4,381,810 | 5/1983 | Cady et al. | 152/209 R |
| 4,385,653 | 5/1983 | Okazaki et al. | 152/209 R |
| 4,396,052 | 8/1983 | Ahagon et al. | 152/209 R |
| 4,407,346 | 10/1983 | Bandel et al. | 152/209 R |
| 4,444,236 | 4/1984 | Kan et al. | 152/209 R |
| 4,527,606 | 7/1985 | Kita et al. | 152/209 R |

FOREIGN PATENT DOCUMENTS 2362627 6/1975 Fed. Rep. of Germany ... 152/209 P

*Primary Examiner*—Michael Ball
*Attorney, Agent, or Firm*—Armstrong, Nikaido, Marmelstein & Kubovcik

[57] ABSTRACT

A pneumatic tire having on its tread surface a tread pattern formed by grooves and having a tread rubber of a two-layer structure comprising a cap rubber layer and a base rubber layer of which the latter comprises a rubber having a lower heat generating characteristic in comparison to a rubber forming the former, the tire being characterized by having a value within the range of from 0.15 to 0.35 for $(Gc/G) \times (Eb/Ec)$, in which G is the total thickness of the tread rubber at the bottom of grooves in the tread pattern, Gc being the thickness of the cap rubber at the bottom of the tread pattern groove, Eb being the modulus at 25% elongation of the base rubber layer, Ec being the comparable modulus of the rubber of the cap rubber layer.

2 Claims, 6 Drawing Figures

BASE-CAP TIRE TREAD

BACKGROUND

The present invention relates to a pneumatic tire and, more particularly, an improved pneumatic tire, the improvement relating to the rolling resistance and the resistance to groove crack generation of the tire.

To minimize the rolling resistance of pneumatic tires, lately there have been propositions made in the tire industry to provide a two-layer structure to the tire tread rubber, comprising a cap rubber layer and a base rubber layer. The propositions are made out of consideration of the fact that the tread rubber tends to exhibit contradictory characteristics with respect to the rolling resistance and the wet skid characteristics of tires, and they are made in an attempt to cancel such tendency of the tread rubber by way of using a rubber capable of exhibiting a remarkable resistance to wet skid for or in the ground-contacting part of the tread rubber, namely the cap rubber layer, while using a rubber capable of providing a low rolling resistance for or in this part of the tread rubber which does not contact the ground or pavement, namely the base rubber layer.

Based on the technical concept of the propositions referred to above, it falls that if, in the thickness of the tread rubber, the proportion of the base rubber layer is increased, by this the rolling resistance can be lowered.

According to the result of experiments conducted by the present inventors, however, it has come to be known that when the proportion occupied by the base rubber layer in the thickness of the tread rubber is increased, the thickness of the cap rubber layer is indispensably reduced at the bottom of grooves forming a tread pattern on the tread surface of the tire, whereby the tire becomes likely to with ease undergo during its running a so-called groove crack trouble, a phenomenon of generation of a crack at the bottom of tire pattern grooves, which is more likely particularly where there is a large difference in the physical properties of rubber, particularly modulus thereof, between the cap rubber layer and the base rubber layer.

SUMMARY

Therefore, according to the present invention, it is contemplated to provide an improved pneumatic tire, improved in or relating to the rolling resistance and the resistance to the groove crack generation or growth.

To this end, the present invention provides a pneumatic tire which has on its tread surface a tread pattern formed by grooves and has a tread rubber of a two-layer structure comprising a cap rubber layer and a base rubber layer of which the latter comprises a rubber having a lower heat generating characteristic in comparison to the rubber forming the former, and of which, on the supposition that the total thickness of the cap rubber layer at bottoms of grooves in the tread pattern is G, the thickness of the cap rubber layer at same bottoms of grooves in the tread pattern being Gc, the modulus at 25% elongation of the rubber of the base rubber layer being Eb and the comparable modulus of the rubber of the cap rubber layer being Ec, the (Gc/G)×(Eb/Ec) value is within the range of from 0.15 to 0.35.

The above and other objects and features of the present invention will become more apparent from considering the following description of the invention taken in conjunction with the accompanying drawings.

THE DRAWINGS

THE PREFERRED EMBODIMENT

With reference to the accompanying drawings, the present invention will now be described in greater detail in connection with a preferred embodiment thereof.

Figure 1:
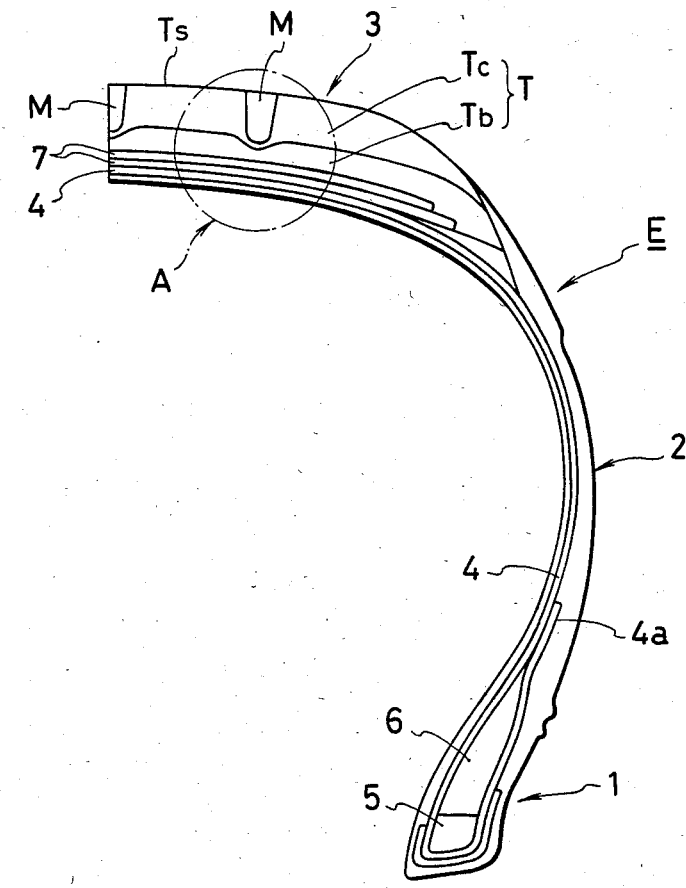
FIG. 1 shows in section a half portion of a pneumatic tire embodying the present invention.
Figure 2:
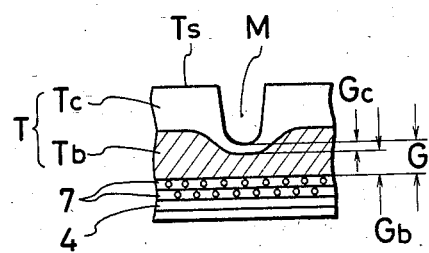
FIG. 2 is a partial view, showing in enlargement the tire portion indicated at A in FIG. 1.

Initially in FIGS. 1 and 2, the reference character E denotes a pneumatic tire embodying the invention, which comprises a left and a right, in pair, of bead portions 1 and 1, a left and a right, in pair, of side walls 2 and 2 connected to and extending from the bead portions, and a tread 3 located between the pair of side walls. Between the pair of bead portions 1 and 1, a carcass cord layer 4 is disposed, the cords of which are inclined substantially at an angle of 90° relative to the tire circumferential direction, and each end of the carcass cord layer 4 is turned over from the inside to the outside, surrounding bead wires 5 located at the position of the bead portion 1, to form a folded-over end portion 4a, which envelopes a bead filler 6 located above the bead wires 5 and is closely contacted to the carcass cord layer 4. On this part of the carcass cord layer 4 which is located at the position of the tread 3, a plurality of cord belt layers 7 are disposed in a mutually crossing arrangement at cord angles of from 10° to 30° relative to the tire circumferential direction.

On the tread surface indicated at Ts of the tread 3, there are provided grooves M forming a tread pattern, and the tread rubber shown by T of the tread 3 comprises a two-layer structure composed of a base rubber layer Tb disposed on the outside of the cord belt layers 7 and a cap rubber layer Tc disposed externally on the base rubber layer Tb and forming the tread surface Ts. The base rubber layer Tb is made of a rubber of which the heat generating characteristic is lower than a rubber used for the cap rubber layer Tc.

Now, supposing that at the bottom of the groove M, the tread rubber T has a total thickness G and the cap rubber layer Tc has a thickness Gc and also that the modulus at 25% elongation of the rubber of the cap rubber layer Tc and that of the rubber of the base rubber layer Tb are Ec and Eb respectively, according to the present invention the value of (Gc/G)×(Eb/Ec) is set to be within the range of from 0.15 to 0.35.

Further, in FIG. 2 the reference character Gb denotes the thickness of the base rubber layer Tb at the bottom of the groove M.

In the case of the embodiment of the invention illustrated in FIG. 1, the total thickness G is 3.0 mm, the thickness Gc is 0.8 mm, the modulus Ec is 0.07 kg/mm$^2$, the modulus Eb is 0.06 kg/mm$^2$ and the (Gc/G)×(Eb/Ec) value is 0.23.

Now, a description will be entered into the circumstances in which the present invention has been made and also a few experiments carried out by the present inventors.

EXPERIMENT 1

The present inventors have conducted an extensive study through experiments on the ratio, $Gc/G$, of the thickness $Gc$ of the cap rubber layer $Tc$ at the bottom of the groove $M$ to the total thickness $G$ of the tread rubber $T$ at the same bottom of the groove $M$, and also the relationship between the modulus values $Ec$ and $Eb$ respectively of the cap rubber layer $Tc$ and the base rubber layer $Tb$ of the tread rubber $T$, for one thing, and the rolling resistance value, for the other.

In the present Experiment 1, use were made of radial tires of the size of 155 SR 13, and four rating standards were set within the range of 1 to about 3 of the ratios, $Ec/Eb$, of the modulus $Ec$ of the cap rubber layer $Tc$ to the modulus $Eb$ of the base rubber layer $Tb$. With the thicknesses of the cap rubber layer $Tc$ and the base rubber layer $Tb$ variously changed while in a green tread condition, the total thickness $G$ of the tread rubber $T$ and the thickness $Gc$ of the cap rubber layer $Tc$ at the bottom of the groove $M$ in section in the radial direction of vulcanized tires were measured, the measurement being made at 6 different points on the tire circumference and the values found being averaged. Also, modulus values found of the rubber of each of the cap rubber layer $Tc$ and the base rubber layer $Tb$ are those at 25% elongation.

Measurements of rolling resistance values were made under the conditions of 1.9 kg/cm² for the air pressure and 390 kg for the load, on rims of $4\frac{1}{2}J \times 13$ and at 40 km/hr, 60 km/hr and 80 km/hr, and the values found were averaged for the purpose of rating.

Figure 3:
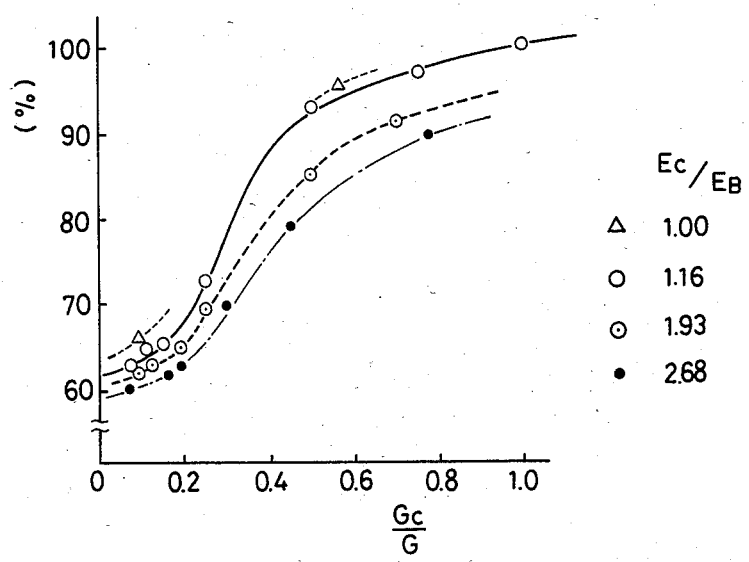
FIG. 3 is a graphic representation of the relationship between Gc/G values and rolling resistance values.

Results of the Experiment are shown in FIG. 3, in which the $Gc/G$ ratios are taken on the abscissa, while taken on the ordinate are rolling resistance values (%) of tires found on a drum of 67 inches in diameter, which are shown in terms of indices relative to the reference case where $Gc/G=1.0$ and $Ec/Eb=1.16$.

From the results of the Experiment, it has been ascertained that when the amount of the base rubber layer $Tb$ is increased, the rolling resistance can be suppressed.

However, as the amount of the base rubber layer $Tb$ is increased or, more particularly, the thickness of the base rubber layer $Tb$ in a green tread condition is so increased as to be close to the total thickness $G$ of the tread rubber at the groove bottom, the thickness $Gc$ of the cap rubber layer $Tc$ at the same groove bottom abruptly tends to be smaller, and also the effect of the base rubber layer $Tb$ to lower the rolling resistance is enhanced as this layer $Tb$ is present closer to the tread surface. From this, it is seen that the change of the rolling resistance does not uniformly or proportionally take place as the ratio $Gc/G$ is changed, and as shown in FIG. 3, the effect of lowering the rolling resistance is all of a sudden enhanced in a region of the $Gc/G$ values smaller than about 0.4.

Then, in connection with the ratio, $Ec/Eb$, of the modulus of the cap rubber layer $Tc$ to that of the base rubber layer $Tb$, it has been found that as this ratio takes a greater value, the rolling resistance is more greatly suppressed.

Figure 4:
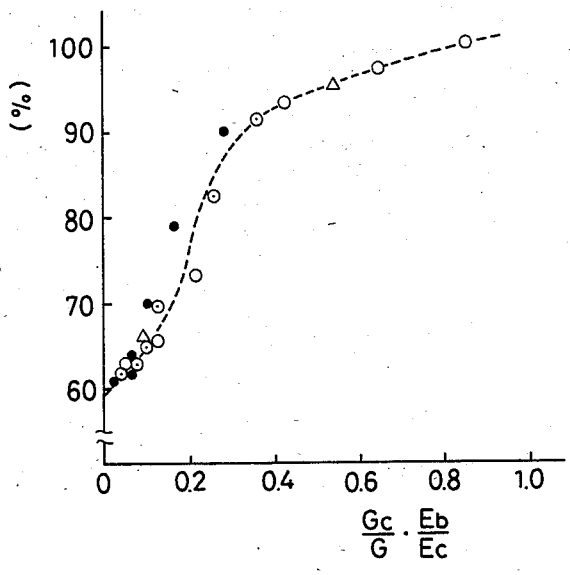
FIG. 4 is a similar graphic view to FIG. 3, and represents the relationship between (Gc/G)×(Eb/Ec) values and rolling resistance values.

FIG. 4 is taken to show the data shown in FIG. 3 in simplification by taking $(Gc/G) \times (Eb/Ec)$ values on the abscissa, and in this FIG. 4, too, the rolling resistance values are taken on the ordinate.

By taking the $(Gc/G) \times (Eb/Ec)$ values on the abscissa of the graph as in FIG. 4, all the data concerned can be arranged almost on a single curve, and from this FIG. 4, it is seen that the effect of lowering the rolling resistance can be greatly enhanced in the region of $(Gc/G) \times (Eb/Ec)$ values below 0.35.

EXPERIMENT 2

Of the same tires as used in the above described Experiment 1, determinations and rating were then made of their ratios of growth of groove cracks.

In the groove bottom of each tire, a cut of 5 mm in length and 1.5 mm in depth was preparatively formed as an initial crack, and each tire was run for 2000 km on a drum of 67 inches in diameter under the conditions of 1.9 kg/cm² for the air pressure, 540 kg for the load and at 81 km/hr. The groove-crack growth ratio means the ratio of the length of the crack found of the tire after the above running test to the length of the initial crack (5 mm).

Figure 5:
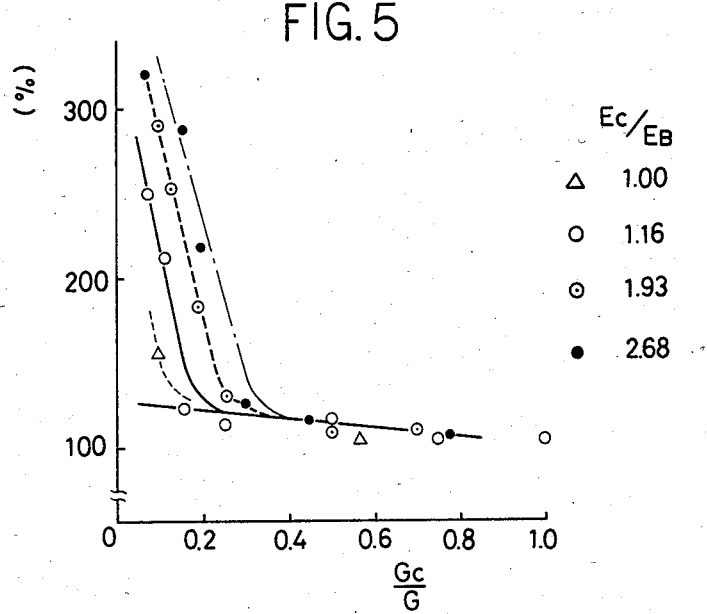
FIG. 5 is a graph taken of the relationship between Gc/G values and ratios of growth of groove cracks.

Test results are shown in FIG. 5, in which the $Gc/G$ values are taken on the abscissa, while the groove-crack growth ratios (%) are taken on the ordinate, of the graph.

From considering the test results, it is seen that when the volume proportion is increased of the base rubber $Tb$ so as to suppress the rolling resistance, the thickness of the cap rubber layer $Tc$ at the bottom of the groove $M$ is reduced and the growth of cracks in grooves is promoted. It at the same time is seen that with tires having a larger value for the ratio $Ec/Eb$ of the modulus of the cap rubber layer $Tc$ to that of the base rubber layer $Tb$, their values of resistance to groove crack generation are abruptly lowered with tires having a greater $Gc/G$ value.

Figure 6:
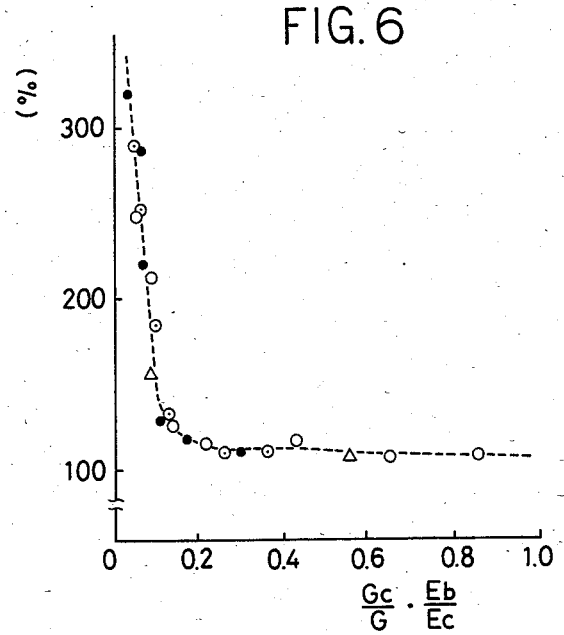
FIG. 6 also is a graph, showing the relationship between (Gc/G)×(Ev/Ec) values and the groove-crack growth ratios.

In a same manner as in the above considered FIG. 4 pertinent to Experiment 1, in FIG. 6 values of $(Gc/G) \times (Eb/Ec)$ are taken on the abscissa of the graph, while groove-crack growth ratios (%) are taken on the ordinate, to show the data entered in FIG. 5 in simplification.

By taking the $(Gc/G) \times (Eb/Ec)$ values on the abscissa as in FIG. 6, all the data can be arranged almost on a single curve, and from FIG. 6 it is seen that the resistance to groove crack abruptly lowers as soon as the $(Gc/G) \times (Eb/Ec)$ values are smaller than 0.15. The $(Gc/G) \times (Eb/Ec)$ values should preferably be 0.20 or above.

EXPERIMENT 3

With use of same tires as in Experiment 1 and by setting $G$ at 3.0 mm, $Gc$ at 0.8 mm, $Ec$ at 0.07 kg/mm², $Eb$ at 0.06 kg/mm² and $(Gc/G) \times (Eb/Ec)$ at 0.23, same tests as in the above Experiments were carried out to obtain desirable results with respect to both of the resistance to groove crack generation and the effect of lowering the rolling resistance.

Also, by setting $G$ at 3.0 mm, $Gc$ at 0.5 mm, $Ec$ at 0.07 kg/mm², $Eb$ at 0.06 kg/mm² and $(Gc/G) \times (Eb/Ec)$ at 0.14, same tests as above were performed to find that although a sufficient effect was obtained of lowering the rolling resistance, the resistance to groove crack generation was inferior to the result of the above recited case where $Gc$ was set at 0.8 mm.

Moreover, by setting $G$ at 3.0 mm, $Gc$ at 1.5 mm, $Ec$ at 0.07 kg/mm², $Eb$ at 0.06 kg/mm² and $(Gc/G) \times (Eb$-

/Ec) at 0.43, same tests as above were conducted to find that although a desirable result was obtained of the resistance to groove crack generation, the effect of lowering the rolling resistance was inferior to the result of the above recited case where Gc was set at 0.8 mm.

As stated above, when in order to suppress the rolling resistance of a tire, the tread rubber T of the tire is made comprising a two-layer structure composed of a cap rubber layer Tc and a base rubber layer Tb, the latter comprising a rubber serving to render the tire exhibiting a remarkably low rolling resistance, as the proportion of the base rubber layer Tb in the thickness of the tread rubber T is increased, the thickness of the cap rubber layer Tc at the bottom of grooves M forming a tread pattern of the tire is inevitably reduced already at the tire building steps, and the so-called groove crack trouble, a phenomenon of generating a crack at the bottom of the tread pattern grooves, tends to easily take place. Therefore, in order to provide a tire which is satisfactory with respect to both of the rolling resistance and the resistance to groove crack generation, it is seen from the above recited test results from Experiments 1 and 2 to be advisable to set the (Gc/G)×(Eb/Ec) value within the range of from 0.15 to 0.35 or, more preferably, from 0.20 to 0.25.

According to the present invention, the value of (Gc/G)×(Eb/Ec) is set within the range of from 0.15 to 0.35, so that not only a remarkable effect can be obtained of lowering the rolling resistance but also the resistance to groove crack generation can be enhanced.

We claim:

1. A pneumatic tire which has on its tread surface a tread pattern formed by grooves and has a tread rubber of a two-layer structure comprising a cap rubber layer and a base rubber layer of which the latter comprises a rubber having a lower heat generating characteristic in comparison to a rubber forming the former, the tire having a value of (Gc/G)×(Eb/Ec) within the range of from 0.15 to 0.35 when the total thickness of said tread rubber at bottoms of said grooves in the tread pattern is G, the thickness of said cap rubber layer at the same bottoms of the tread pattern grooves as above being Gc, the modulus at 25% elongation of the rubber of said base rubber layer being Ec and that of the rubber of said cap rubber layer being Ec.

2. A pneumatic tire as claimed in claim 1, of which said value of (Gc/G)×(Eb/Ec) is within the range of from 0.02 to 0.25.

* * * * *